(12) United States Patent
Horowitz et al.

(10) Patent No.: US 12,395,632 B2
(45) Date of Patent: Aug. 19, 2025

(54) SETTING A MAXIMUM QUANTIZATION PARAMETER FOR ENCODING A VIDEO FRAME

(71) Applicant: Google LLC, Mountain View, CA (US)

(72) Inventors: Michael Horowitz, Austin, TX (US); Danil Chapovalov, Stockholm (SE); Marco Paniconi, Campbell, CA (US)

(73) Assignee: GOOGLE LLC, Mountain View, CA (US)

( * ) Notice: Subject to any disclaimer, the term of this patent is extended or adjusted under 35 U.S.C. 154(b) by 236 days.

(21) Appl. No.: 17/943,645

(22) Filed: Sep. 13, 2022

(65) Prior Publication Data
US 2024/0089435 A1    Mar. 14, 2024

(51) Int. Cl.
*H04N 19/124*     (2014.01)
*H04N 19/164*     (2014.01)
*H04N 19/172*     (2014.01)

(52) U.S. Cl.
CPC ......... *H04N 19/124* (2014.11); *H04N 19/164* (2014.11); *H04N 19/172* (2014.11)

(58) Field of Classification Search
CPC .. H04N 19/124; H04N 19/164; H04N 19/172; H04N 19/136; H04N 19/15; H04N 19/176
See application file for complete search history.

(56) References Cited

U.S. PATENT DOCUMENTS

| | | | |
|---|---|---|---|
| 7,010,034 B2 * | 3/2006 | Bruls | H04N 19/177 |
| | | | 375/E7.22 |
| 10,091,507 B2 * | 10/2018 | Lee | H04N 19/176 |
| 10,674,158 B2 * | 6/2020 | Carmel | H04N 19/192 |
| 11,343,467 B1 * | 5/2022 | Li | H04N 7/147 |
| 11,936,698 B2 * | 3/2024 | Khire | H04N 19/14 |
| 2003/0043904 A1 | 3/2003 | Naito | |
| 2006/0013298 A1 | 1/2006 | Tong et al. | |
| 2010/0189174 A1 * | 7/2010 | Potdar | H04N 19/124 |
| | | | 375/240.03 |
| 2011/0249073 A1 | 10/2011 | Cranfill et al. | |
| 2014/0267572 A1 * | 9/2014 | Bright-Thomas | H04N 19/30 |
| | | | 348/14.09 |
| 2014/0376617 A1 * | 12/2014 | Yang | H04N 19/187 |
| | | | 375/240.03 |
| 2016/0366414 A1 * | 12/2016 | Zhang | H04N 19/503 |

(Continued)

OTHER PUBLICATIONS

International Search Report and Written Opinion for Application No. PCT/US2023/029199, mailed Oct. 31, 2023, 17 pages.

(Continued)

*Primary Examiner* — Gims S Philippe
(74) *Attorney, Agent, or Firm* — DORITY & MANNING P.A.

(57) ABSTRACT

A computer-implemented method includes setting, by a participant computing device participating in a videoconference, a maximum quantization parameter (QP) value for encoding a predetermined type of video frame to a value which is the lesser of: a first QP value determined based on an average value of QP values used to encode video frames before the predetermined type of video frame, or a second QP value corresponding to an application-specified maximum QP value. The computer-implemented method further includes encoding the predetermined type of video frame using the set maximum QP value.

20 Claims, 8 Drawing Sheets

(56) References Cited

U.S. PATENT DOCUMENTS

| | | | |
|---|---|---|---|
| 2019/0089957 A1* | 3/2019 | Zhang | H04N 19/146 |
| 2022/0174181 A1* | 6/2022 | Mizoguchi | H04N 1/407 |
| 2022/0256114 A1 | 8/2022 | Li et al. | |
| 2023/0421763 A1* | 12/2023 | Kuang | H04N 19/96 |

OTHER PUBLICATIONS

International Preliminary Report on Patentability for Application No. PCT/US2023/029199, mailed Mar. 27, 2025, 11 pages.

* cited by examiner

SETTING A MAXIMUM QUANTIZATION PARAMETER FOR ENCODING A VIDEO FRAME

FIELD

The disclosure relates to videoconferences (which may also be referred to as a video call or videotelephony) conducted over a network. More particularly, the disclosure relates to video processing operations of a participant computing device participating in a videoconference that is conducted via a computer network.

BACKGROUND

Videoconferences include a system of telecommunications in which computing devices are employed in the transmission of audio and visual signals, allowing two or more people to participate in a real-time conversation from different locations.

In a videoconference, keyframes which are processed via a videoconferencing application can require higher bit rates to encode and transmit than non-keyframes. For example, a keyframe may refer to a special frame used in compressed video formats which provide a codec with useful information about frames (sometimes referred to as delta frames or p-frames) coming after the keyframe. This enables frames (e.g., the delta frames or p-frames) in between the keyframes to be compressed into a much smaller space than if they each were a full description of the whole uncompressed image content. For example, frame information for the in-between frames (i.e., the delta frames or p-frames) may contain only the differences between the new frame and a previous one and/or the previous keyframe.

SUMMARY

Aspects and advantages of embodiments of the disclosure will be set forth in part in the following description, or can be learned from the description, or can be learned through practice of the embodiments.

One example aspect of the disclosure is directed to a computer-implemented method which includes setting, by a participant computing device participating in a videoconference, a maximum quantization parameter (QP) value for encoding a predetermined type of video frame to a value which is the lesser of: a first QP value determined based on an average value of QP values used to encode video frames before the predetermined type of video frame, or a second QP value corresponding to an application-specified maximum QP value. The computer-implemented method further includes encoding the predetermined type of video frame using the set maximum QP value. That is, the encoder uses a QP value or values that are less than or equal to the set maximum QP value for encoding the predetermined type of video frame. The encoder uses the maximum QP value (e.g., QP_max) internally to encode the predetermined type of video frame at QP<=QP_max. This guarantees that the encoder will not encode the predetermined type of video frame at QP>QP_max, so it provides a quality bound.

Another example aspect of the disclosure is directed to a computing system (e.g., a participant computing device) which includes one or more processors and one or more non-transitory computer-readable media that store instructions that, when executed by the one or more processors, cause the computing system to perform operations. For example, the operations may include setting, by the computing system participating in a videoconference, a maximum quantization parameter (QP) value for encoding a predetermined type of video frame to a value which is the lesser of: a first QP value determined based on an average value of QP values used to encode video frames before the predetermined type of video frame, or a second QP value corresponding to an application-specified maximum QP value, and encoding the predetermined type of video frame using the set maximum QP value.

Another example aspect of the disclosure is directed to a computer-implemented method which includes setting, by a participant computing device participating in a videoconference, a maximum quantization parameter (QP) value for encoding a keyframe to a value which is the lesser of: a first QP value determined based on an average value of QP values used to encode video frames before the keyframe, or a second QP value corresponding to an application-specified maximum QP value. The computer-implemented method further includes encoding the keyframe based on the set maximum QP value and, when the set maximum QP value corresponds to the first QP value, encoding one or more video frames subsequent to the keyframe based on the set maximum QP value by increasing the set maximum QP value by a predetermined rate for each of the one or more video frames until the application-specified maximum QP value is reached.

In one or more example embodiments, a computer-readable medium (e.g., a non-transitory computer-readable medium) which stores instructions that are executable by one or more processors of a participant computing device is provided. In some implementations the computer-readable medium stores instructions which may include instructions to cause the one or more processors to perform one or more operations of any of the methods described herein (e.g., operations of the participant computing device). The computer-readable medium may store additional instructions to execute other aspects of the participant computing device and corresponding methods of operation, as described herein.

These and other features, aspects, and advantages of various embodiments of the disclosure will become better understood with reference to the following description and appended claims. The accompanying drawings, which are incorporated in and constitute a part of this disclosure, illustrate example embodiments and, together with the description, serve to explain the related principles.

BRIEF DESCRIPTION OF THE DRAWINGS

Detailed discussion of embodiments directed to one of ordinary skill in the art is set forth in the specification, which makes reference to the appended drawings, in which.

DETAILED DESCRIPTION

Figure 1A:
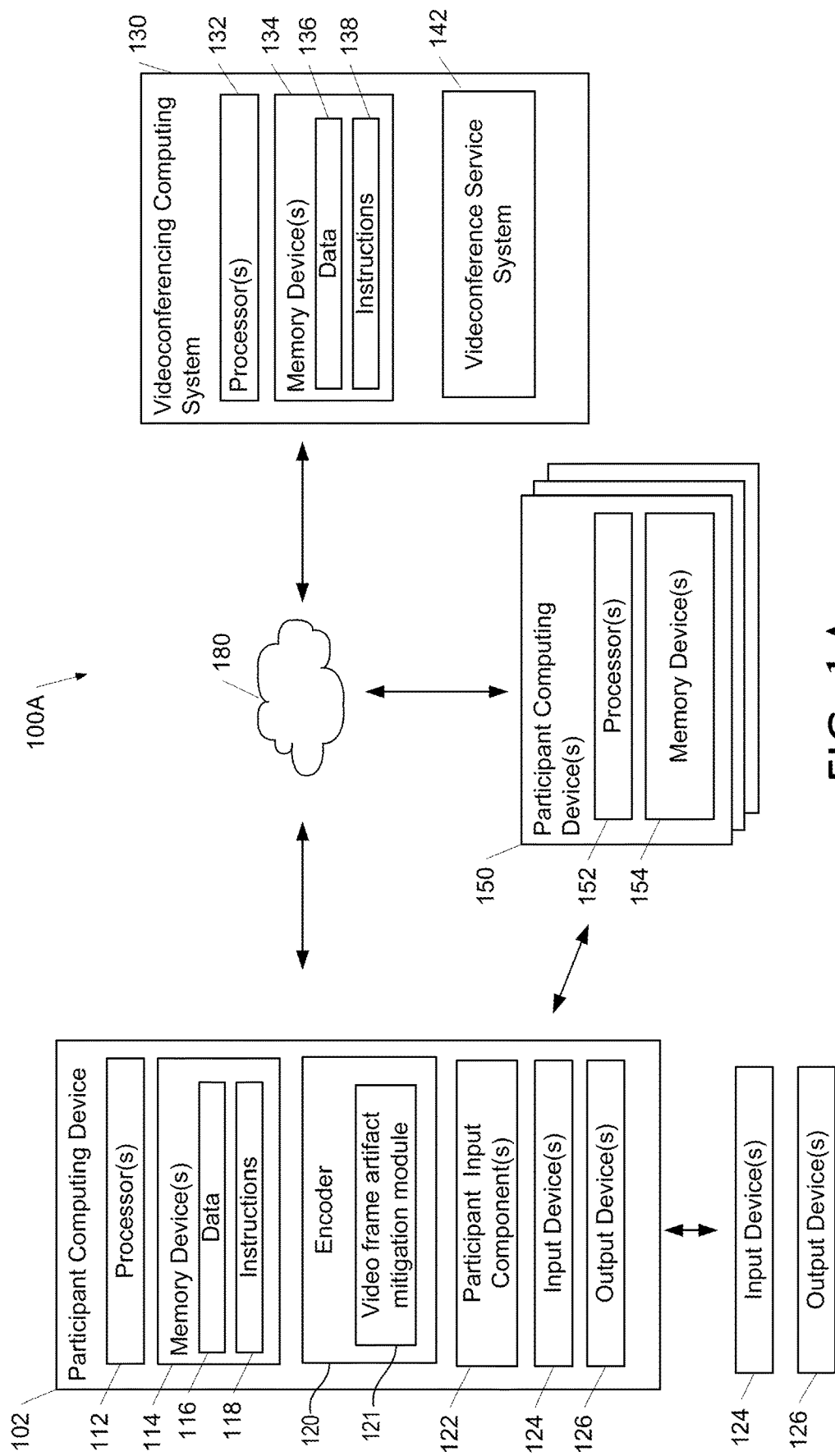
FIG. 1A depicts an example system, according to one or more example embodiments of the disclosure.

Reference now will be made to embodiments of the disclosure, one or more examples of which are illustrated in the drawings, wherein like reference characters across drawings are intended to denote like features in various implementations. Each example is provided by way of explanation of the disclosure and is not intended to limit the disclosure.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

It will be understood that when an element is referred to as being "connected" to another element, the expression encompasses an example of a direct connection or direct coupling, as well as a connection or coupling with one or more other elements interposed therebetween.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

Generally, the disclosure is directed to video processing operations of a participant computing device participating in a videoconference (which may also be referred to as a video call or videotelephony) conducted over a network. More particularly, the disclosure relates to encoding video frames generated by a participant computing device participating in a videoconference that is conducted via the cloud.

Broadcast: As used herein, broadcast or broadcasting refers to any real-time transmission of data (e.g., audio data, video data, AR/VR data, etc.) from a user device and/or from a centralized device that facilitates a videoconference (e.g., a centralized server device, etc.). For example, a broadcast may refer to the direct or indirect transmission of data from a user device to a number of other user devices. It should be noted that, in some implementations, broadcast or broadcasting can include the encoding and/or decoding of transmitted and/or received data. For example, a user device broadcasting video data may encode the video data using a codec. User devices receiving the broadcast may decode the video using the codec.

Participant: As used herein, a participant may refer to any user, group of users, device, and/or group of devices that participate in a live exchange of data (e.g., videoconference, video call, etc.). More specifically, the term participant may be used throughout the specification to refer to either user(s) or user device(s) utilized by the user(s) within the context of a videoconference. For example, a group of participants may refer to a group of users that participate remotely in a videoconference with their own user devices (e.g., smartphones, laptops, wearable devices, teleconferencing devices, broadcasting devices, etc.). As another example, a participant may refer to a group of users utilizing a single computing device for participation in a videoconference (e.g., a videoconferencing device within a meeting room, etc.). As another example, a participant may refer to a broadcasting device (e.g., webcam, microphone, etc.) unassociated with a particular user that broadcasts data to participants of a teleconference. As yet another example, a participant may refer to a bot or an automated user that participates in a videoconference to provide various services or features for other participants in the videoconference (e.g., recording data from the teleconference, providing virtual assistant services, providing testing services, etc.).

Videoconference: As used herein, a videoconference is any communication or live exchange of data (e.g., audio data, video data, AR/VR data, etc.) between a number of participants. For example, the videoconference includes multiple participants utilizing computing devices to transmit video data and/or audio data to each other in real-time. As another example, a videoconference may refer to an AR/VR conferencing service in which AR/VR data (e.g., pose data, image data, etc.) sufficient to generate a three-dimensional representation of a participant is exchanged amongst participants in real-time. As another example, a videoconference may refer to a media conference in which different types or combinations of data are exchanged amongst participants (e.g., audio data, video data, AR/VR data, a combination of audio and video data, etc.).

According to various example embodiments disclosed herein, a participating computing device may generate or encode a keyframe at various times. For example, when a new participant computing device joins a videoconference, participant computing devices already in the videoconference generate (encode) and send the specially-encoded keyframe that enables the new participant computing device to start viewing the videoconference. As a result, the senders of each video that the new participant will view will contain a keyframe. All other participant computing devices viewing those videos will also receive the keyframes. Keyframes generally require a much higher bit rate to encode and transmit than non-keyframes. In the context of videoconferencing applications, relatively low bit rates are used for conducting videoconferences compared to the much higher bit rate used to encode and transmit keyframes. As such, in videoconferencing applications, keyframes are typically coded at a lower bit rate (i.e., with a lower quality) to prevent the encoder from producing a burst of encoded bits that can introduce undesirable latency due to video frames requiring a large number of bits to encode take longer to transmit over a bandwidth-restricted network. When keyframes have lower quality than video frames immediately preceding or succeeding them, participants already in the videoconference can experience the lower-quality keyframes as a distracting strobing artifact resulting from the significant quality difference between the keyframes and surrounding frames, especially those frames immediately preceding the keyframe.

As the number of participant computing devices participating in a videoconference grows, the frequency of keyframes required each time a new participant computing device joins increases, further degrading the viewing experience for users of the participant computing devices already in the videoconference. Without mitigation techniques, participant computing devices in very large meetings (e.g., meetings with more than 1000 participant computing devices) can experience many keyframes per second. One way to reduce keyframe frequency is to introduce keyframes at a prescribed time interval (e.g., every two seconds, every ten seconds, etc.). While these periodic keyframes may mitigate the problem of high keyframe frequency to some extent, participant computing devices already in the videoconference will see keyframe-induced periodic distracting video strobing or other visual artifacts such as pulsing or flicking.

A participating computing device may receive a keyframe at times other than a new participating computing device joins the videoconference. For example, when a viewing participant computing device in the conference requests a change in video resolution (e.g., resizing a window, pinning a participant computing device), a keyframe is generated (encoded) and transmitted from the sending participant computing device to comply with the resolution switch request and all other participant computing devices viewing video at the requested resolution will receive the keyframe.

A participating computing device may also receive a keyframe to recover from network errors (e.g., packet loss). When a participant computing device experiences packet loss and normal loss mitigation mechanisms fail, that participant computing device may request a keyframe from all participant computing devices sending video to them to recover. All other participant computing devices viewing those video streams will also receive the keyframes (even though they did not experience packet loss).

According to example embodiments disclosed herein, a participant computing device is configured to reduce or prevent distracting video artifacts such as strobing, pulsing, and flicking that are caused by the generation and reception of lower-quality keyframes. The participant computing device includes an encoder which is configured to set a maximum quantization parameter (QP) for keyframes and video frames immediately following the keyframes to ensure video quality continuity. In video coding, the QP controls the tradeoff between video quality and encoded bit rate. For a given encoder, a larger QP value results in lowering the bit rate and lowering the video quality. Conversely, as the QP value becomes smaller, the bit rate and video quality increase. Limiting the maximum QP value can result in higher video quality and higher bit rate.

According to one or more examples of the disclosure a participant computing device is configured to set a maximum or capped QP for keyframes and video frames immediately following keyframes to ensure video quality continuity. For example, in some implementations the maximum (or capped) QP value that is applied to the keyframe and succeeding frames is computed as: $max\_qp = min(a*avg\_qp + recovery\_qp, MAX\_QP)$ where a is a value between 0 and 1, avg_qp is the average value of the QP used to encode video frames immediately preceding the keyframe (e.g., a predetermined number of video frames immediately preceding the keyframe such as 10 frames, or video frames immediately preceding the keyframe within a predetermined period of time before the keyframe is encoded such as video frames within one second, one-half second, one-third second, etc., before the keyframe), recovery_qp is a positive term intended to restore max_qp to its nominal value (application-specified maximum QP value) in a controlled manner, and MAX_QP is the application-specified maximum QP value. That is, the encoder uses a QP value or values that are less than or equal to the set maximum QP value for encoding the predetermined type of video frame. The encoder uses the maximum QP value (e.g., QP_max) internally to encode the predetermined type of video frame at QP QP_max. This guarantees that the encoder will not encode the predetermined type of video frame at QP>QP_max, so as to provide a quality bound.

For example, the value of the parameters a and recovery_qp depend on the content of the video. For example, the value of the constant a should be slightly larger when the avg_qp values are large (i.e., lower peak signal-to-noise ratio) and slightly smaller when avg_qp values are small (i.e., higher peak signal-to-noise ratio). The peak signal-to-noise ratio (a.k.a., PSNR) is a common metric to objectively measure video quality. In general, as the PSNR increases, the video quality increases (i.e., a high video quality corresponds to a high PSNR and a low video quality corresponds to a low PSNR). For example, according to examples of the disclosure a value of the constant a between 0.80 and 0.90 (e.g., 0.85) provides a good balance between video quality and bit rate. A recovery_qp value equal to 60 QP steps per second (QPS) also results in improved video quality where video artifacts such as strobing and pulsing are reduced or prevented. For example, if the max_qp is set to 40 for the keyframe, and the MAX_QP is 60, then a recovery_qp QP value of 60 QPS will step the QP value up at a predetermined rate from 40 to 60 in one-third of a second for video frames subsequent to the key frame (i.e., increasing the set QP value by a value of 20 takes one-third of a second, and for a frame rate of 30 FPS, then each frame's QP value will increase by 2 until the MAX_QP is reached). For example, the recovery_qp QP value may be a value between 30 QPS and 90 QPS. For example, the recovery_qp QP value may be dependent on the codec being utilized, with codecs having a lower MAX_QP value having a lower recovery_qp QP value and codecs having a higher MAX_QP value having a higher recovery_qp QP value.

As another example, when the video frame rate is 30 FPS, then the recovery_qp value can equal 2*N, where N is the number of frames since the last keyframe.

In some implementations, the method for capping a maximum QP value is applied selectively. For example, the method for capping a maximum QP value may be applied to participant computing devices which are identified as merely participants and passive watchers in the videoconference and are not presenting (e.g., screensharing or user(s) of participant computing device(s) are actively speaking) in a videoconference. In such cases (e.g., when implementing a maximum QP capping mode) an increased latency which may occur in implementing the disclosed method remains acceptable. In contrast, the method for capping the maximum QP value may not be applied to participant computing devices who have participants who are presenting to others (e.g., user(s) of participant computing device(s) actively speaking or screensharing) in the videoconference so as to operate in a low latency mode (i.e., a lower latency than in the maximum QP capping mode).

The disclosure provides numerous technical effects and benefits. Video processing of keyframes, especially in a videoconferencing session with a large number of participants, can result in video artifacts such as strobing, pulsing, and flicking. According to the examples disclosed herein, such video artifacts can be mitigated or prevented, thereby improving a quality of the video viewed by users of participant computing devices. For example, by controlling a QP value for encoding a keyframe and frames subsequent to the keyframe, bit rate and video quality can be improved while the latency of the video may be kept at an acceptable level.

With reference now to the drawings, example embodiments of the disclosure will be discussed in further detail.

FIG. 1A depicts a block diagram of an example computing system 100A that performs encoding operations with respect to a predetermined type of video frame (e.g., a keyframe) according to example embodiments of the disclosure. The computing system 100A includes a participant computing device 102 that is associated with a participant in a videoconference, a videoconferencing computing system 130, and, in some implementations, one or more other participant computing devices 150 respectively associated with one or more other participants in the videoconference.

The participant computing device 102 can be any type of computing device, such as, for example, a personal computing device (e.g., laptop or desktop), a mobile computing device (e.g., smartphone or tablet), a gaming console or controller, a wearable computing device (e.g., a virtual/augmented reality device, etc.), an embedded computing device, a broadcasting computing device (e.g., a webcam, etc.), or any other type of computing device.

The participant computing device 102 includes one or more processors 112 and one or more memory devices 114. The one or more processors 112 can be any suitable processing device (e.g., a processor core, a microprocessor, an ASIC, an FPGA, a controller, a microcontroller, etc.) and can be one processor or a plurality of processors that are operatively connected (e.g., in parallel). The one or more memory devices 114 can include one or more non-transitory computer-readable storage media, such as RAM, ROM, EEPROM, EPROM, flash memory devices, magnetic disks, etc., and combinations thereof. The one or more memory devices 114 can store data 116 and instructions 118 which are executed by the one or more processors 112 to cause the participant computing device 102 to perform operations.

The participant computing device 102 includes an encoder 120 to encode video frames which are broadcast or transmitted to the videoconferencing computing system 130 and/or to the one or more other participant computing devices 150 for conducting the videoconference. The encoder 120 may include various codecs to encode the video frames. Example video codecs may include VP8, VP9, AV1, HEVC, H.264 and the like. For example, according to one or more examples of the disclosure, the encoder 120 may include a video frame artifact mitigation module 121 which is configured to set a maximum or capped QP for keyframes and video frames immediately following the keyframes to ensure video quality continuity. Operations of the encoder 120 and video frame artifact mitigation module 121 are described in more detail herein.

The participant computing device 102 can also include one or more participant input components 122 that receive a user input. For example, the one or more participant input components 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example participant input components include a microphone, a traditional keyboard, or other devices by which a participant can provide user input.

In some implementations, the participant computing device 102 can include, or can be communicatively coupled to, one or more input devices 124. For example, the one or more input devices 124 may include a camera device configured to capture video data of a user of the participant computing device 102 (e.g., for broadcast, etc.). In some implementations, the one or more input devices 124 may include a plurality of camera devices communicatively coupled to the participant computing device 102 that are configured to capture image data from different poses for generation of three-dimensional representations (e.g., a representation of a user of the participant computing device 102, etc.). In some implementations, the one or more input devices 124 may include audio capture devices, such as microphones. In some implementations, the one or more input devices 124 may include sensor devices configured to capture sensor data indicative of movements and/or locations of a user of the participant computing device 102 (e.g., accelerometer(s), Global Positioning Satellite (GPS) sensor(s), gyroscope(s), infrared sensor(s), head tracking sensor(s) such as magnetic capture system(s), an omni-directional treadmill device, sensor(s) configured to track eye movements of the user, etc.).

In some implementations, the participant computing device 102 can include, or be communicatively coupled to, one or more output devices 126. The one or more output devices 126 can be, or otherwise include, a device configured to output audio data, image data, video data, etc. For example, the one or more output devices 126 may include a display device (e.g., a television, projector, smartphone display device, etc.) and a corresponding audio output device (e.g., speakers, headphones, etc.). As another example, the one or more output devices 126 may include display devices for an augmented reality device or virtual reality device.

The videoconferencing computing system 130 includes one or more processors 132 and one or more memory devices 134. The one or more processors 132 can be any suitable processing device (e.g., a processor core, a microprocessor, an ASIC, an FPGA, a controller, a microcontroller, etc.) and can be one processor or a plurality of processors that are operatively connected (e.g., in parallel). The one or more memory devices 134 can include one or more non-transitory computer-readable storage media, such as RAM, ROM, EEPROM, EPROM, flash memory devices, magnetic disks, etc., and combinations thereof. The one or more memory devices 134 can store data 136 and instructions 138 which are executed by the one or more processors 132 to cause the videoconferencing computing system 130 to perform operations.

In some implementations, the videoconferencing computing system 130 includes or is otherwise implemented by one or more server computing devices. In instances in which the videoconferencing computing system 130 includes plural server computing devices, such server computing devices can operate according to sequential computing architectures, parallel computing architectures, or some combination thereof.

In some implementations, the videoconferencing computing system 130 can receive data of various types from the participant computing device 102 and the one or more other participant computing devices 150 (e.g., via the network 180, etc.). For example, in some implementations, the participant computing device 102 can capture video data, audio data, multimedia data (e.g., video data and audio data, etc.), sensor data, etc. and transmit such data to the videoconferencing computing system 130. The videoconferencing computing system 130 may receive the data (e.g., via the network 180).

In some implementations, the videoconferencing computing system 130 may receive data from the participant computing device 102 and the one or more other participant computing devices 150, according to various encryption scheme(s) (e.g., codec(s), lossy compression scheme(s), lossless compression scheme(s), etc.). For example, the participant computing device 102 may encode video data with a video codec via encoder 120, and then transmit the encoded video data to the videoconferencing computing system 130. In some implementations, the participant computing device 102 may encode video data with the video codec via encoder 120, and then transmit the encoded video data to the one or more other participant computing devices 150 directly, or indirectly via the videoconferencing computing system 130 or indirectly via another server system. The video codec implemented by the encoder 120 and video frame artifact mitigation module 121 to encode frames such as the keyframe and delta frames may include VP8, VP9, AV1, HEVC, H.264 and the like. The videoconferencing computing system 130 and the one or more other participant computing devices 150 may decode the encoded video data with the corresponding video codec. In some implementations, the participant computing device 102 may dynamically select between a number of different codecs with varying degrees of loss based on conditions of the network 180, the participant computing device 102, the one or more other participant computing devices 150, and/or the videoconferencing computing system 130. For example, the participant computing device 102 may dynamically switch from video data transmission according to a lossy encoding scheme to video data transmission according to a lossless encoding scheme based on a signal strength between the participant computing device 102 and the network 180.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the videoconferencing computing system 130 may include a videoconferencing service system 142. The videoconferencing service system 142 may be configured to facilitate videoconferencing services for multiple participants. For example, the videoconferencing service system 142 may receive and broadcast data (e.g., video data, audio data, etc.) between the participant computing device 102 and one or more other participant computing devices 150. A videoconferencing service can be any type of application or service that receives and broadcasts data from multiple participants. For example, in some implementations, the videoconferencing service may receive data (e.g., audio data, video data, both audio and video data, etc.) from some participants and broadcasts such data to other participants.

As an example, the videoconferencing service system 142 can provide a videoconference service to multiple participants. One of the participants can transmit audio and video data to the videoconferencing service system 142 using a user device (e.g., a participant computing device 102, etc.). A different participant can transmit audio data to the videoconferencing service system 142 with a user device. The videoconferencing service system 142 can receive the data from the participants and broadcast the data to each user device of the multiple participants.

As another example, the videoconferencing service system 142 may implement an augmented reality (AR) or virtual reality (VR) conferencing service for multiple participants. One of the participants can transmit AR/VR data sufficient to generate a three-dimensional representation of the participant to the videoconferencing service system 142 via a device (e.g., video data, audio data, sensor data indicative of a pose and/or movement of a participant, etc.). The videoconferencing service system 142 can transmit the AR/VR data to devices of the other participants. In such fashion, the videoconferencing service system 142 can facilitate any type or manner of videoconferencing services to multiple participants.

It should be noted that the videoconferencing service system 142 may facilitate the flow of data between participants (e.g., participant computing device 102, the one or more other participant computing devices 150, etc.) in any manner that is sufficient to implement the videoconferencing service. In some implementations, the videoconferencing service system 142 may be configured to receive data from participants, decode the data, encode the data, broadcast the data to other participants, etc. For example, the videoconferencing service system 142 may receive encoded video data from the participant computing device 102. The videoconferencing service system 142 can decode the video data according to a video codec utilized by the participant computing device 102. The videoconferencing service system 142 can encode the video data with a video codec and broadcast the data to participant computing devices.

Additionally, or alternatively, in some implementations, the videoconferencing service system 142 can facilitate peer-to-peer videoconferencing services between participants. For example, in some implementations, the videoconferencing service system 142 may dynamically switch between provision of server-side videoconferencing services and facilitation of peer-to-peer videoconferencing services based on various factors (e.g., network load, processing load, requested quality, etc.).

The participant computing device 102 can receive data broadcast from the videoconferencing service system 142 of videoconferencing computing system 130 as part of a videoconferencing service (video data, audio data, etc.). In some implementations, the participant computing device 102 can upscale or downscale the data (e.g., video data) based on a role associated with the data. For example, the data may be video data associated with a participant of the participant computing device 102 that is assigned an active speaker role. The participant computing device 102 can upscale the video data associated with the participant in the active speaker role for display in a high-resolution display region (e.g., a region of the one or more output devices 126). For another example, the video data may be associated with a participant with a non-speaker role. The participant computing device 102 can downscale the video data associated with the participant in the non-speaker role using a downscaling algorithm (e.g., lanczos filtering, Spline filtering, bilinear interpolation, bicubic interpolation, etc.) for display in a low-resolution display region. In some implementations, the roles of participants associated with video data can be signaled to computing devices (e.g., participant computing device 102, the one or more other participant computing devices 150, etc.) by the videoconferencing service system 142 of the videoconferencing computing system 130.

The videoconferencing computing system 130 and the participant computing device 102 can communicate with the one or more other participant computing devices 150 via the network 180. The one or more other participant computing devices 150 can be any type of computing device(s), such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), or any other type of computing device.

The one or more other participant computing devices 150 includes one or more processors 152 and one or more memory device 154 as described with regards to the participant computing device 102. In some implementations, the one or more other participant computing devices 150 can be substantially similar to, or identical to, the participant computing device 102. Alternatively, in some implementations, the one or more other participant computing devices 150 may be different devices than the participant computing device 102 that can also facilitate videoconferencing with the videoconferencing computing system 130. For example, the participant computing device 102 may be a laptop and the one or more other participant computing devices 150 may be smartphone(s).

Figure 2A:
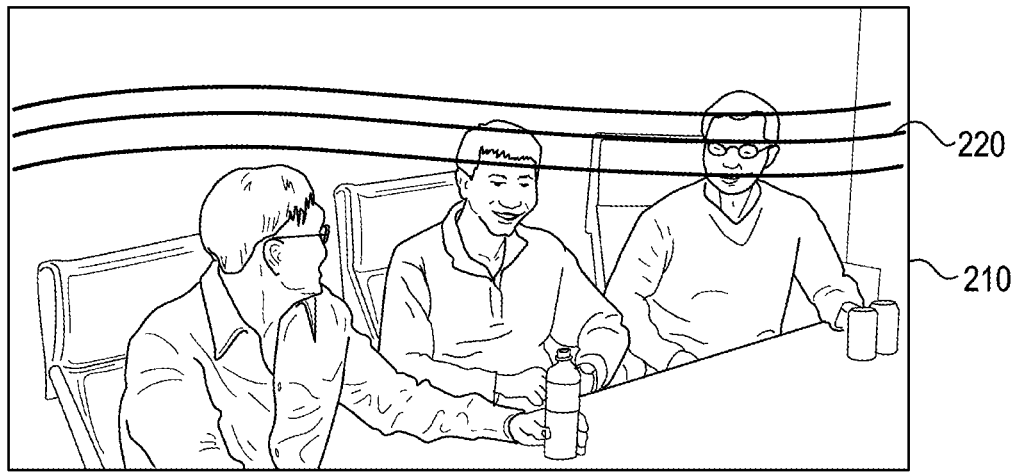
FIGS. 2A-2B depict example illustrations of a video without mitigating keyframe artifacts and with mitigating keyframe artifacts, respectively, according to one or more example embodiments of the disclosure.
Figure 2B:
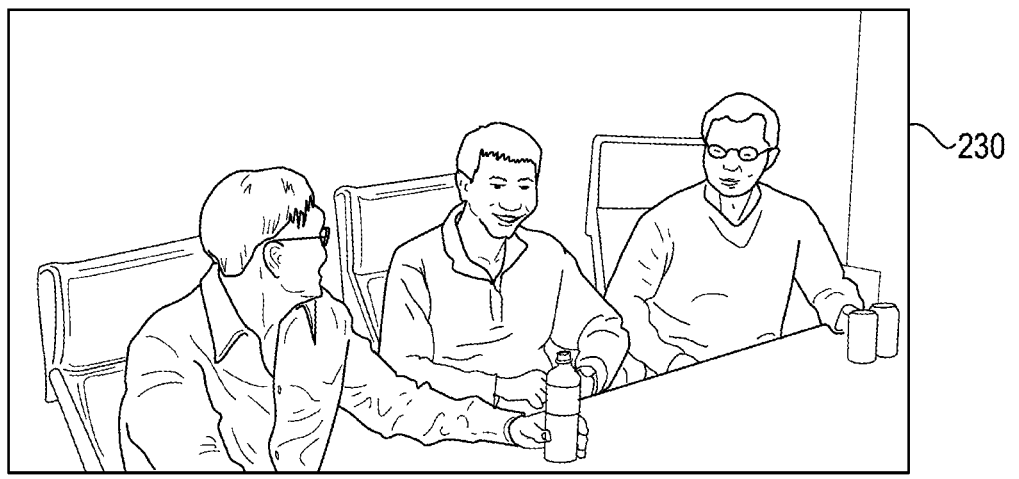

FIGS. 2A-2B depict example illustrations of a video without mitigating keyframe artifacts and with mitigating keyframe artifacts, respectively, according to one or more example embodiments of the disclosure. For example, referring to FIG. 2A, a video 210 received and presented on a display of a participant computing device includes an artifact 220 such as strobing, pulsing, or flicking, which can occur when a participant computing device receives a large number of keyframes during a videoconference (e.g., in a videoconference with hundreds or thousands of participant computing devices). For example, referring to FIG. 2B, a video 230 received by a participant computing device does not include such artifacts which are mitigated or prevented by the incorporation of the video frame artifact mitigation module 121 which is configured to set a maximum or capped QP for keyframes and video frames immediately following keyframes to ensure video quality continuity, according to examples of the disclosure described herein.

Referring back to FIG. 1A, in some implementations the video frame artifact mitigation module 121 may be configured to set a maximum or capped QP for a predetermined type of frame (e.g., a keyframe) and for the video frames immediately following the predetermined type of frame, to ensure video quality continuity so as to avoid video artifacts which are encountered when keyframes are introduced, as shown in the example of FIG. 2A. For example, in some implementations the video frame artifact mitigation module 121 may be configured to set the maximum (or capped) QP value that is applied to the predetermined type of frame and succeeding frames by determining a minimum value between a first QP value and a second QP value and setting the maximum QP value to the one of the first QP value and the second QP value having the minimum value between the two values. For example, the video frame artifact mitigation module 121 may compute the maximum (or capped) QP value according to the formula of max_qp=min(a*avg_qp+recovery_qp, MAX_QP) where a is a value between 0 and 1, avg_qp is the average value of the QP(s) used to encode video frames immediately preceding the keyframe, recovery_qp is a positive term intended to restore max_qp to its nominal value (application-specified maximum QP value) in a controlled manner, and MAX_QP is the application-specified maximum QP value.

For example, the first QP value may be represented by the value obtained from the formula: a*avg_qp+recovery_qp, and the second QP value may be represented by the value corresponding to MAX_QP which is the application-specified maximum QP value.

For example, the average value of QP values used to encode video frames immediately preceding the keyframe may be determined according to an average value of QP values used to encode a predetermined number of video frames immediately preceding the keyframe such as 10 frames, 20 frames, 30 frames, etc. As another example, the average value of QP values used to encode video frames immediately preceding the keyframe may be determined according to an average value of QP values used to encode video frames immediately preceding the keyframe within a predetermined period of time before the keyframe is encoded such as video frames which are encoded within one second, one-half second, one-third second, etc., before the keyframe.

For example, the value of the parameters a and recovery_qp may depend on the content of the video. For example, the value of the constant a may be set slightly larger when the avg_qp values are large (i.e., lower peak signal-to-noise ratio) and slightly smaller when avg_qp values are small (i.e., higher peak signal-to-noise ratio). Thus, the value of the constant a may be higher when there is a higher noise level compared to a value of the constant a when there is a lower noise level. For example, according to examples of the disclosure a value of the constant a between 0.80 and 0.90 (e.g., 0.85) provides a good balance between video quality and bit rate. For example, a recovery_qp value equal to 60 QP steps per second also results in improved video quality where video artifacts such as strobing and pulsing are reduced or prevented. For example, if the video frame artifact mitigation module 121 sets the max_qp to 40 for the keyframe, and the MAX_QP is 60, then a recovery_qp QP value of 60 QPS will step the QP value up at a predetermined rate from a value of 40 QP to a value of 60 QP in one-third of a second for video frames subsequent to the key frame (i.e., increasing the set QP value by a value of 20 takes one-third of a second, and for a frame rate of 30 FPS, then each frame's QP value will increase by 2 until the MAX_QP is reached). For example, the recovery_qp QP value may be a value between 30 QPS and 90 QPS. For example, the recovery_qp QP value may be dependent on the codec being utilized, with codecs having a lower MAX_QP value having a lower recovery_qp QP value and codecs having a higher MAX_QP value having a higher recovery_qp QP value.

As another example, when the video frame rate is 30 FPS, then the video frame artifact mitigation module 121 may set the recovery_qp value to be equal to 2*N, where N is the number of frames since the last keyframe.

In some implementations, the method for capping a maximum QP value may be applied selectively by the video frame artifact mitigation module 121. For example, the video frame artifact mitigation module 121 may be configured to apply the method for capping a maximum QP value to a participant computing device which is not presenting in a videoconference, and the video frame artifact mitigation module 121 may be configured to not apply (or may be prevented from applying) the method for capping the maximum QP value to a participant computing device which is presenting in the videoconference.

For example, the video frame artifact mitigation module 121 may be configured to apply the method for capping a maximum QP value to the participant computing device 102 when generating and encoding the keyframe. As mentioned above, the keyframe may be generated and encoded in response to another participating computing device (e.g., the one or more other participant computing devices 150) joining the videoconference, in response to a request to change a video resolution by another participant computing device (the one or more other participant computing devices 150) participating in the videoconference, in response to a request sent to the participating computing device for the keyframe from another participant computing device (e.g., the one or more other participant computing devices 150) participating in the videoconference which is recovering from a network error.

Figure 1B:
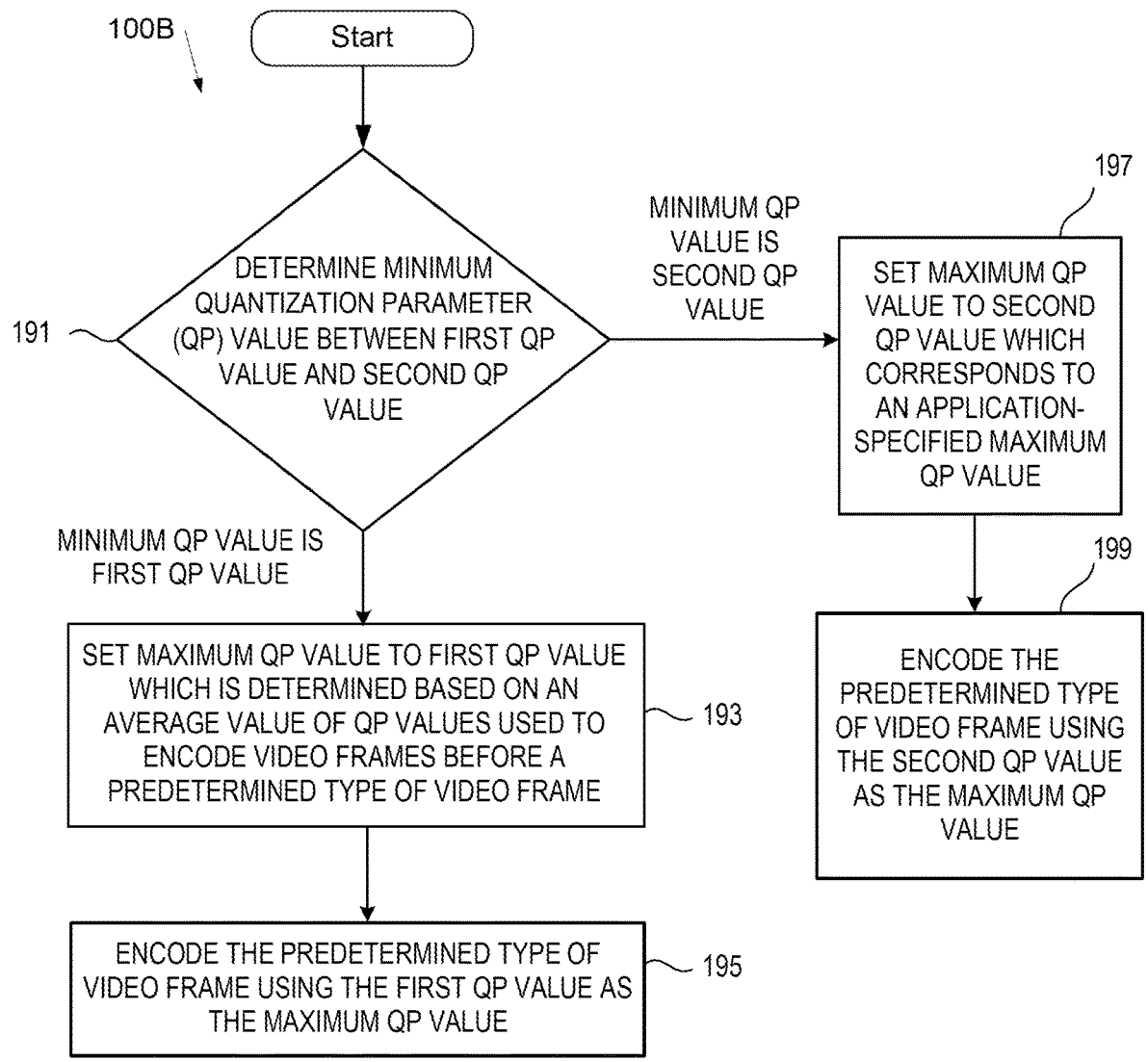
FIG. 1B illustrates an example flow diagram of a non-limiting computer-implemented method according to one or more example embodiments of the disclosure.

A method for implementing operations of the video frame artifact mitigation module 121 is depicted in FIG. 1B which illustrates a flow chart diagram of a non-limiting computer-implemented method according to one or more example embodiments of the disclosure. Although FIG. 1B depicts operations performed in a particular order for purposes of illustration and discussion, the methods of the disclosure are not limited to the particularly illustrated order or arrangement. The various operations of the method 100B can be omitted, rearranged, combined, and/or adapted in various ways without deviating from the scope of the disclosure.

The method may be implemented by the video frame artifact mitigation module 121 of the participant computing device 102, for example, when a keyframe is to be generated and encoded, and subsequently transmitted to the one or more other participant computing devices 150 and/or the videoconferencing computing system 130. For example, a keyframe may be generated and encoded by the video frame artifact mitigation module 121 in response to another participating computing device (e.g., the one or more other participant computing devices 150) joining the videoconference, in response to a request to change a video resolution by another participant computing device (the one or more other participant computing devices 150) participating in the videoconference, in response to a request sent to the participating computing device for the keyframe from another participant computing device (e.g., the one or more other participant computing devices 150) participating in the videoconference which is recovering from a network error, etc.

For generating and encoding the keyframe, at 191, a computing system such as the participant computing device 102 may be configured to determine a minimum quantization parameter (QP) value between a first QP value and second QP value. For example, the video frame artifact mitigation module 121 may be configured to compute the maximum (or capped) QP value according to the formula of max_qp=min(a*avg_qp+recovery_qp, MAX_QP) where a is a value between 0 and 1, avg_qp is the average value of the QP(s) used to encode video frames immediately preceding the keyframe, recovery_qp is a positive term intended to restore max_qp to its nominal value (application-specified maximum QP value) in a controlled manner, and MAX_QP is the application-specified maximum QP value. For example, the first QP value may be represented by the value obtained from the formula: a*avg_qp+recovery_qp, and the second QP value may be represented by the value corresponding to MAX_QP which is the application-specified maximum QP value.

When the minimum QP value between the first QP value and the second QP value is the first QP value, at 193 the computing system (e.g., the video frame artifact mitigation module 121) may be configured to set the maximum QP value (max_qp) to the first QP value which is determined based on an average value of QP values used to encode video frames before a predetermined type of video frame (e.g., a keyframe) is to be encoded.

At 195, the computing system (e.g., encoder 120) may be configured to encode the predetermined type of video frame using the first QP value as the maximum QP value. The encoded predetermined type of video frame (e.g., the keyframe) may be transmitted to the one or more other participant computing devices 150 and/or the videoconferencing computing system 130 for conducting the videoconferencing session. Video frames (e.g., delta frames) subsequent to the predetermined type of video frame can also be encoded based on the first QP value by steadily increasing the first QP value for each respective video frame until the application-specified maximum QP value is reached. A recovery rate for the video frames (e.g., delta frames) subsequent to the predetermined type of video frame may vary according to a type of codec being utilized and the corresponding application-specified maximum QP value, a content of the video, and the like. As mentioned above, the video codec implemented by the encoder 120 and video frame artifact mitigation module 121 to encode frames such as the keyframe and delta frames may include VP8, VP9, AV1, HEVC, H.264 and the like. Different video codecs may have different application-specified maximum QP values. For example, the maximum QP value for some profiles of H.264 is 51 while the maximum QP value for AV1 is 63. For example, the recovery_qp QP value may be set by the video frame artifact mitigation module 121 to a value between 30 QPS and 90 QPS. For example, the recovery_qp QP value may be set by the video frame artifact mitigation module 121 based on the codec being utilized, with codecs having a lower MAX_QP value having a lower recovery_qp QP value and codecs having a higher MAX_QP value having a higher recovery_qp QP value.

When the minimum QP value between the first QP value and the second QP value is the second QP value, at 197 the computing system (e.g., the video frame artifact mitigation module 121) may be configured to set the maximum QP value (max_qp) to the second QP value which corresponds to an application-specified maximum QP value.

At 199, the computing system (e.g., encoder 120) may be configured to encode the predetermined type of video frame using the second QP value as the maximum QP value. The encoded predetermined type of video frame (e.g., the keyframe) may be transmitted to the one or more other participant computing devices 150 and/or the videoconferencing computing system 130 for conducting the videoconferencing session.

FIGS. 3A-3F depict example graphs illustrating encoding results for processing video according to a first test video, according to one or more example embodiments of the disclosure.

Figure 3A:
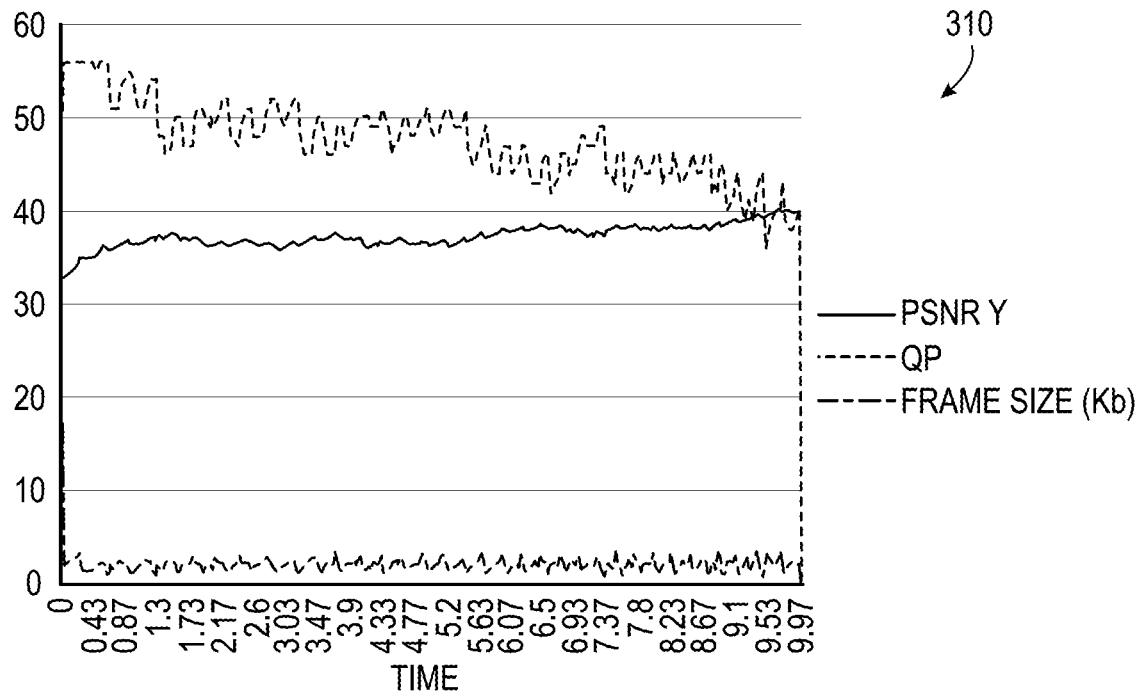
FIGS. 3A-3F depict example graphs illustrating encoding results for processing video according to a first test video, according to one or more example embodiments of the disclosure.

Referring to FIG. 3A, a first graph 310 illustrates encoding results for processing video according to a first test video where no keyframes are encoded. As can be seen from first graph 310, the frame size of each of the video frames is generally consistent and the peak signal-to-noise ratio (PSNR), while trending upward, does not fluctuate greatly.

Figure 3B:
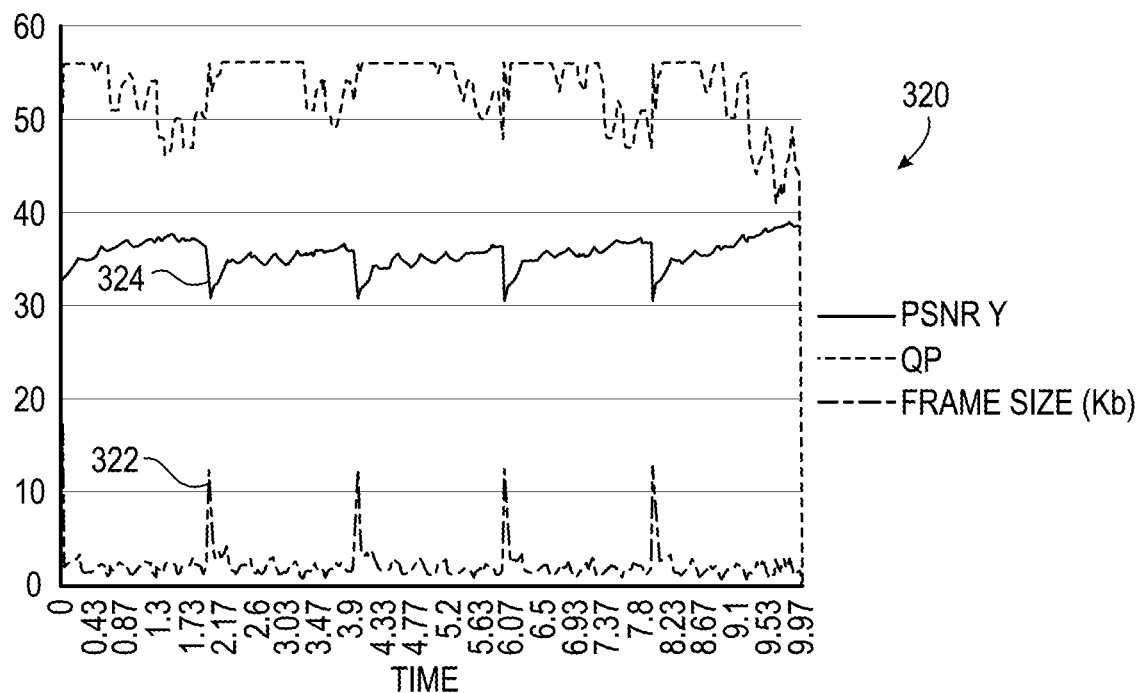

Referring to FIG. 3B, a second graph 320 illustrates encoding results for processing video according to the first test video where keyframes are encoded, however the method for mitigating video artifacts as disclosed herein is not applied. As can be seen from second graph 320, the frame size of each of the video frames is generally consistent until the keyframe is encoded, which occurs at each of the bit rate spike points, for example as indicated by reference numeral 322. Corresponding to the encoding of the keyframe at the point indicated by reference numeral 322, a sharp drop in the PSNR also occurs (for example, by about 6 dB) at a point indicated by reference numeral 324. The sharp drops in the PSNR which occur each time a keyframe is introduced are undesirable and are indicative of the video artifacts such as pulses or strobing which appear in a video presented on a display of a participant computing device which receives the video during a videoconference. Furthermore, the application-specified maximum QP value of 56 is applied when encoding the keyframe.

Figure 3C:
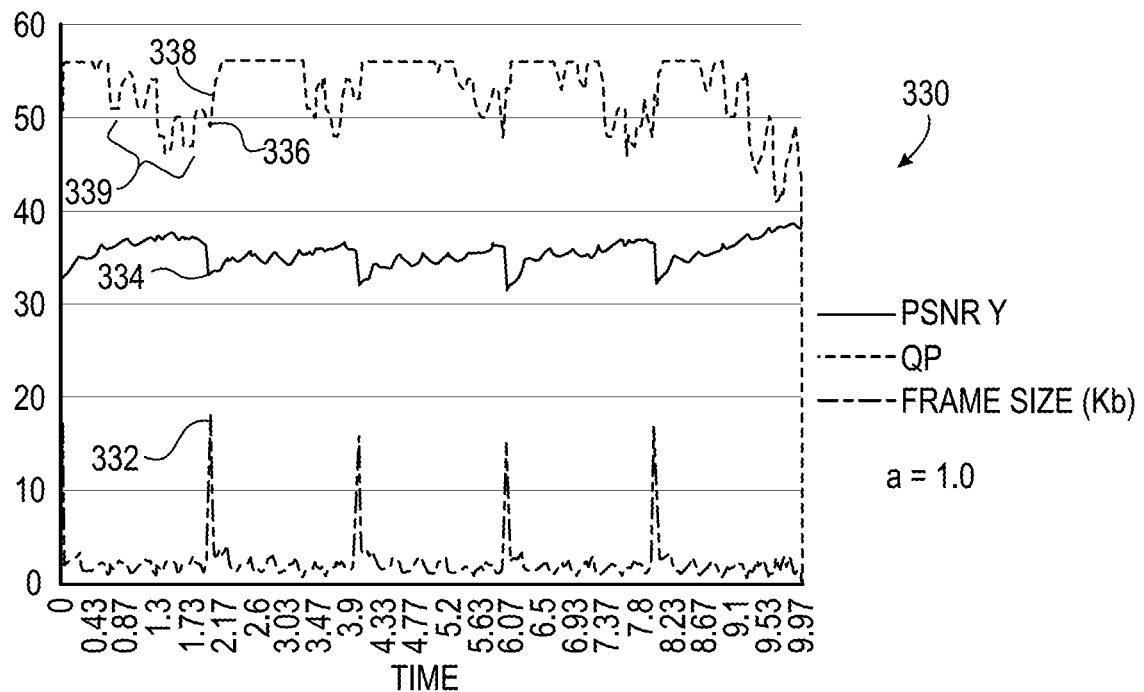

Referring to FIG. 3C, a third graph 330 illustrates encoding results for processing video according to the first test video where keyframes are encoded according to the method for mitigating video artifacts as disclosed herein, where the constant a has a value of one. As can be seen from third graph 330, the frame size of each of the video frames is generally consistent until the keyframe is encoded, which occurs at each of the bit rate spike points, for example as indicated by reference numeral 332. Compared to the example of FIG. 3B, the frame size of the keyframe in FIG. 3C is much larger than the keyframe of FIG. 3B (e.g., 17.77 kB compared to 12.17 kB). Corresponding to the encoding of the keyframe at the point indicated by reference numeral 332, a drop in the PSNR also occurs (for example, by about 3 dB) at a point indicated by reference numeral 334, which is less of a decline compared to the decline in PSNR as described with respect to FIG. 3B. In contrast to the example of FIG. 3B where the application-specified maximum QP value of 56 is applied when encoding the keyframe resulting in a lower quality keyframe, when the method for mitigating video artifacts as disclosed herein is applied the keyframe is encoded with a lower QP value (e.g., of about 49 as indicated by reference numeral 336). Video frames subsequent to the keyframe are also encoded by the video frame artifact mitigation module 121 by applying the method for mitigating video artifacts as disclosed herein, by steadily increasing the QP value according to a predetermined rate until reaching the application-specified maximum QP value, as indicated by reference numeral 338. For example, the QP value increases by about 2 for every frame after the keyframe until the application-specified maximum QP value is reached. As a tradeoff for processing the keyframe at a higher frame size, a latency may increase. For example, the average time for transmitting the keyframes according to the example of FIG. 3C may be about 270 ms (1000*8*average keyframe size/target bit rate or 1000*8*22.49 kilobytes/481,000 bits/sec) while the average time for transmitting the keyframes according to the example of FIG. 3B may be about 220 ms (1000*8*average keyframe size/target bit rate or 1000*8*13.29 kilobytes/481,000 bits/sec).

Figure 3D:
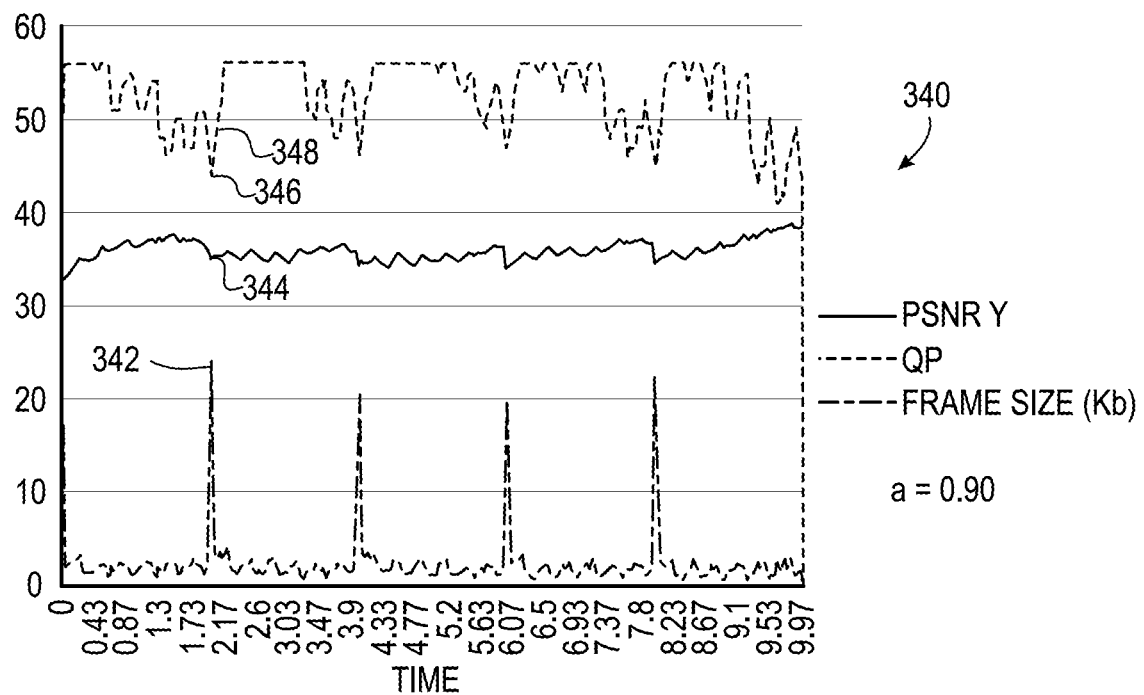

Referring to FIG. 3D, a fourth graph 340 illustrates encoding results for processing video according to the first test video where keyframes are encoded according to the method for mitigating video artifacts as disclosed herein, where the constant a has a value of 0.9. As can be seen from fourth graph 340, the frame size of each of the video frames is generally consistent until the keyframe is encoded, which occurs at each of the bit rate spike points, for example as indicated by reference numeral 342. Compared to the example of FIG. 3B, the frame size of the keyframe in FIG. 3D is much larger than the keyframe of FIG. 3B (e.g., 22.99 kB compared to 12.17 kB). Corresponding to the encoding of the keyframe at the point indicated by reference numeral 342, a slight drop in the PSNR also occurs (for example, by about 1 dB) at a point indicated by reference numeral 344, which is less of a decline compared to the decline in PSNR as described with respect to FIG. 3B. In contrast to the example of FIG. 3B where the application-specified maximum QP value of 56 is applied when encoding the keyframe resulting in a lower quality keyframe, when the method for mitigating video artifacts as disclosed herein is applied the keyframe is encoded with a lower QP value (e.g., of about 44 as indicated by reference numeral 346). Video frames subsequent to the keyframe are also encoded by the video frame artifact mitigation module 121 by applying the method for mitigating video artifacts as disclosed herein, by steadily increasing the QP value according to a predetermined rate until reaching the application-specified maximum QP value, as indicated by reference numeral 348. For example, the QP value increases by about 2 for every frame after the keyframe until the application-specified maximum QP value is reached. As a tradeoff for processing the keyframe at a higher frame size, a latency may increase. For example, the average time for transmitting the keyframes according to the example of FIG. 3D may be about 343 ms (1000*8*average keyframe size/target bit rate or 1000*8*20.61 kilobytes/481,000 bits/sec) while the average time for transmitting the keyframes according to the example of FIG. 3B may be about 220 ms. However, the increased latency is considered to be at an acceptable level for video telephony applications where participant interaction is infrequent and is less noticeable or perceptible to participants in a videoconferencing session than video artifacts such as strobing or pulsing.

Figure 3E:
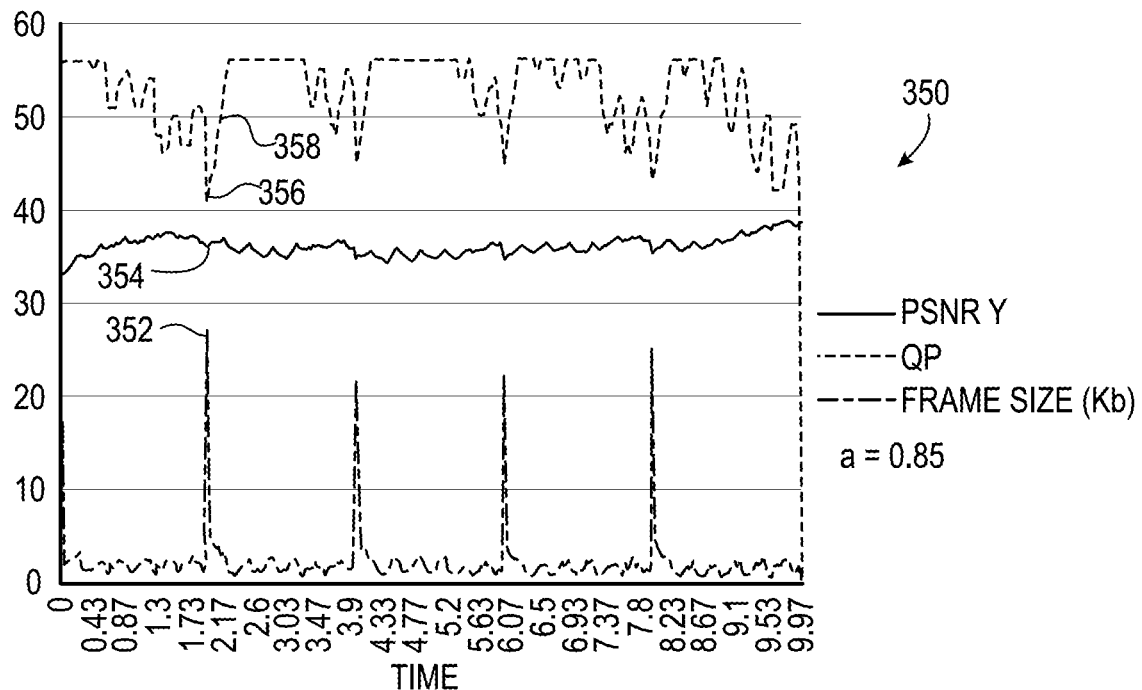

Referring to FIG. 3E, a fifth graph 350 illustrates encoding results for processing video according to the first test video where keyframes are encoded according to the method for mitigating video artifacts as disclosed herein, where the constant a has a value of 0.85. As can be seen from fifth graph 350, the frame size of each of the video frames is generally consistent until the keyframe is encoded, which occurs at each of the bit rate spike points, for example as indicated by reference numeral 352. Compared to the example of FIG. 3B, the frame size of the keyframe in FIG. 3E is much larger than the keyframe of FIG. 3B (e.g., 26.60 kB compared to 12.17 kB). Corresponding to the encoding of the keyframe at the point indicated by reference numeral 352, a slight drop in the PSNR also occurs (for example, less than 1 dB) at a point indicated by reference numeral 354, which is less of a decline compared to the decline in PSNR as described with respect to FIG. 3B. In contrast to the example of FIG. 3B where the application-specified maximum QP value of 56 is applied when encoding the keyframe resulting in a lower quality keyframe, when the method for mitigating video artifacts as disclosed herein is applied the keyframe is encoded with a lower QP value (e.g., of about 41 as indicated by reference numeral 356). Video frames subsequent to the keyframe are also encoded by the video frame artifact mitigation module 121 by applying the method for mitigating video artifacts as disclosed herein, by steadily increasing the QP value according to a predetermined rate until reaching the application-specified maximum QP value, as indicated by reference numeral 358. For example, the QP value increases by about 2 for every frame after the keyframe until the application-specified maximum QP value is reached. As a tradeoff for processing the keyframe at a higher frame size, a latency may increase. For example, the average time for transmitting the keyframes according to the example of FIG. 3E may be about 374 ms (1000*8*average keyframe size/target bit rate or 1000*8*22.49 kilobytes/481,000 bits/sec) while the average time for transmitting the keyframes according to the example of FIG. 3B may be about 220 ms (1000*8*average keyframe size/target bit rate or 1000*8*13.29 kilobytes/481,000 bits/sec). However, the increased latency is considered to be at an acceptable level for video telephony applications where participant interaction is infrequent and is less noticeable or perceptible to participants in a videoconferencing session than video artifacts such as strobing or pulsing.

Figure 3F:
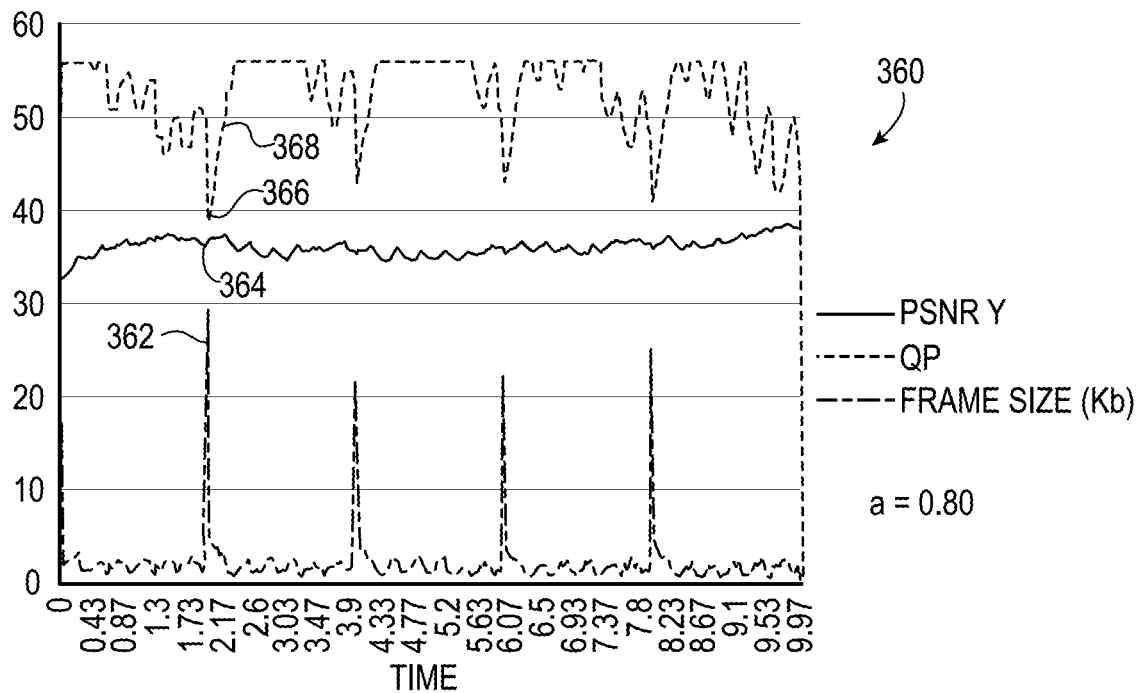

Referring to FIG. 3F, a sixth graph 360 illustrates encoding results for processing video according to the first test video where keyframes are encoded according to the method for mitigating video artifacts as disclosed herein, where the constant a has a value of 0.80. As can be seen from sixth graph 360, the frame size of each of the video frames is generally consistent until the keyframe is encoded, which occurs at each of the bit rate spike points, for example as indicated by reference numeral 362. Compared to the example of FIG. 3B, the frame size of the keyframe in FIG. 3F is much larger than the keyframe of FIG. 3B (e.g., 29.43 kB compared to 12.17 kB). Corresponding to the encoding of the keyframe at the point indicated by reference numeral 362, a slight increase in the PSNR also occurs (for example, less than 1 dB) at a point indicated by reference numeral 364, which is less of a fluctuation compared to the fluctuation in PSNR as described with respect to FIG. 3B. In contrast to the example of FIG. 3B where the application-specified maximum QP value of 56 is applied when encoding the keyframe resulting in a lower quality keyframe, when the method for mitigating video artifacts as disclosed herein is applied the keyframe is encoded with a lower QP value (e.g., of about 39 as indicated by reference numeral 366). Video frames subsequent to the keyframe are also encoded by the video frame artifact mitigation module 121 by applying the method for mitigating video artifacts as disclosed herein, by steadily increasing the QP value according to a predetermined rate until reaching the application-specified maximum QP value, as indicated by reference numeral 368. For example, the QP value increases by about 2 for every frame after the keyframe until the application-specified maximum QP value is reached. As a tradeoff for processing the keyframe at a higher frame size, a latency may increase. For example, the average time for transmitting the keyframes according to the example of FIG. 3E may be about 407 ms (1000*8*average keyframe size/target bit rate or 1000*8*24.50 kilobytes/481,000 bits/sec) while the average time for transmitting the keyframes according to the example of FIG. 3B may be about 220 ms (1000*8*average keyframe size/target bit rate or 1000*8*13.29 kilobytes/481,000 bits/sec). However, the increased latency is considered to be at an acceptable level for video telephony applications where participant interaction is infrequent and is less noticeable or perceptible to participants in a videoconferencing session than video artifacts such as strobing or pulsing.

As can be seen from the above-described examples, by applying the method for mitigating video artifacts as disclosed herein a standard deviation in PSNR can be reduced (i.e., less fluctuations are encountered in processing or encoding the keyframe as well as for video frames subsequent to the keyframe). For example, an average PSNR obtained for the first test video with respect to the example of FIG. 3B was 35.49 dB and a PSNR standard deviation was 1.48, while an average PSNR obtained with respect to the example of FIG. 3E was 36.02 dB and a PSNR standard deviation was 0.99. In addition, the average bit rate over the entire first test video from the example of FIG. 3B was 486,128 bits/second while the average bit rate over the entire test video in the example of FIG. 3E was 488,848 bits/second. Therefore, similar bit rates were achieved while a steady and higher quality video is obtained (i.e., with the absence or reduction of video artifacts such as pulsing and strobing) by driving down the QP value which is applied to the keyframe when encoding the keyframe according to the method disclosed herein. For example, an average QP value for video frames encoded overall can be reduced, an average bit rate can be kept within an acceptable level of a target bit rate (e.g., within 5% of a target bit rate), a PSNR can be raised, a PSNR standard deviation can be reduced, and/or a ratio of an average keyframe size to an average P frame size can be kept within an acceptable level (e.g., a ratio of 15 or less, for example between 11 and 14).

As mentioned above, according to the method for mitigating video artifacts as disclosed herein in determining the first QP value, an average of QP values for video frames encoded immediately prior to the keyframe (e.g., as indicated by reference numeral 339 in FIG. 3C) is determined. In some instances where the average QP values of video frames encoded before the keyframe are high, the computed first QP value may be greater than the application-specified maximum QP value (i.e., higher than the MAX_QP). In such instances, the video frame artifact mitigation module 121 determines that the application-specified maximum QP value is the minimum value between the first QP value and the second QP value and applies the application-specified maximum QP value when encoding the keyframe and video frames subsequent to the keyframe.

Figure 4A:
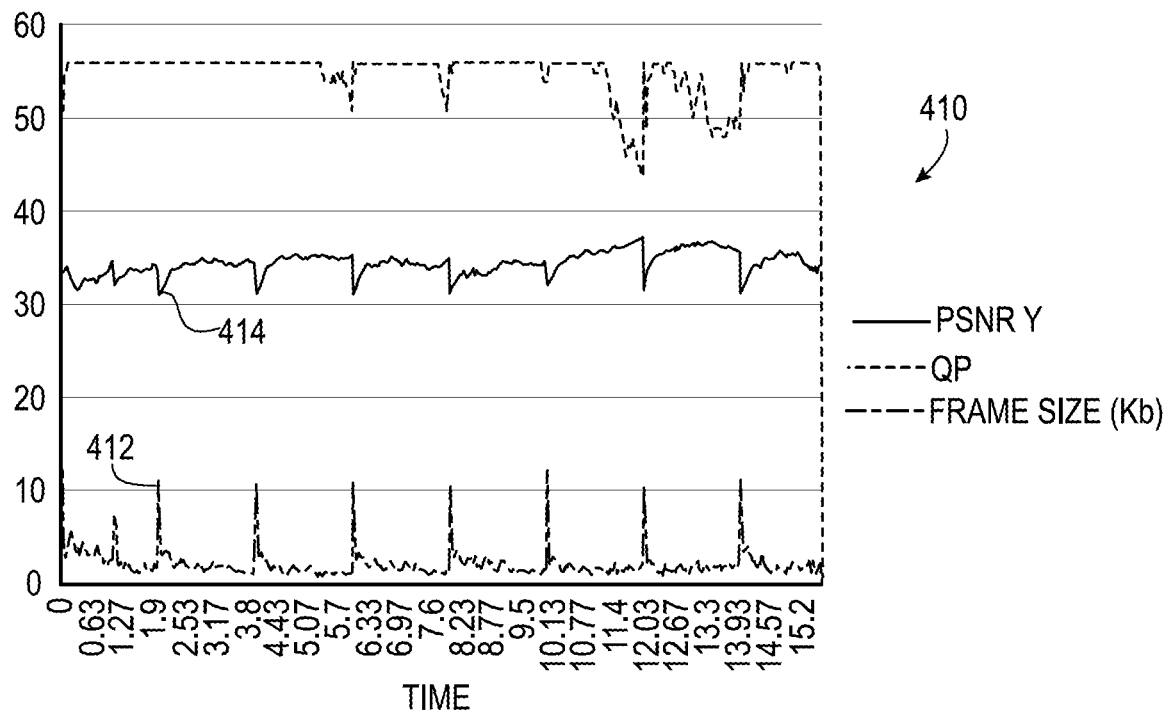
FIGS. 4A-4B depict example graphs illustrating encoding results for processing video according to a second test video, according to one or more example embodiments of the disclosure.
Figure 4B:
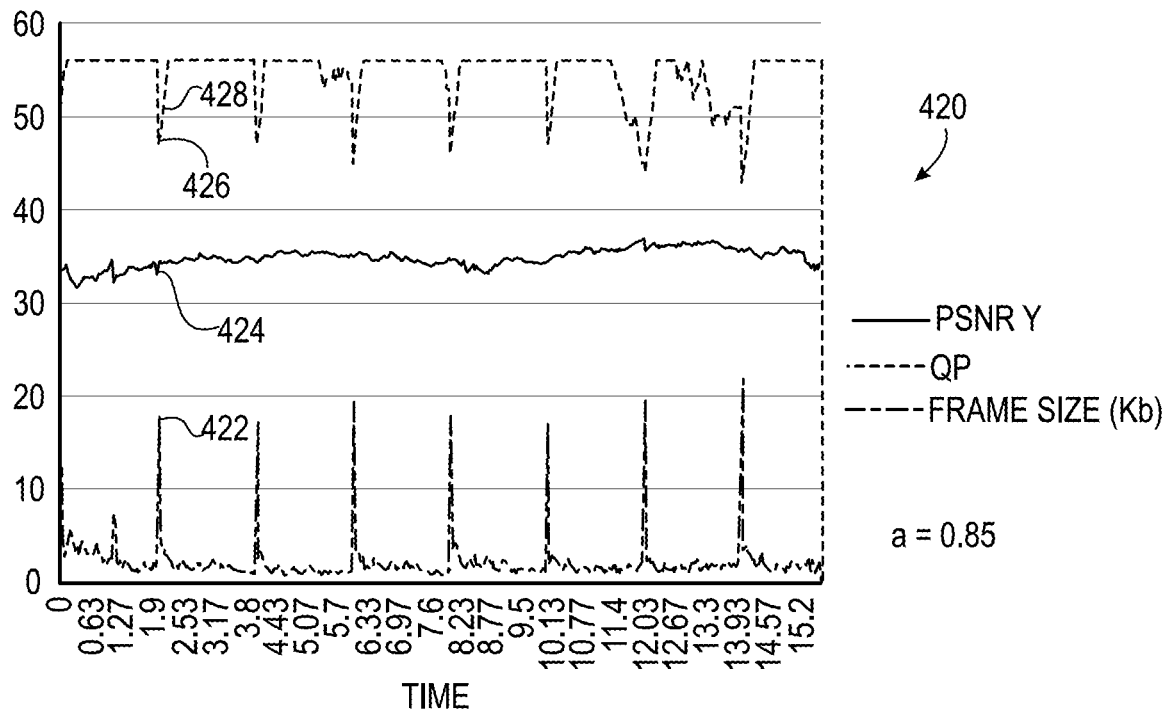

FIGS. 4A-4B depict example graphs illustrating encoding results for processing video according to a second test video, according to one or more example embodiments of the disclosure.

Referring to FIG. 4A, a first graph 410 illustrates encoding results for processing video according to the second test video where keyframes are encoded, however the method for mitigating video artifacts as disclosed herein is not applied. As can be seen from first graph 410, the frame size of each of the video frames is generally consistent until the keyframe is encoded, which occurs at each of the bit rate spike points, for example as indicated by reference numeral 412. Corresponding to the encoding of the keyframe at the point indicated by reference numeral 412, a sharp drop in the PSNR also occurs (for example, by about 2 dB) at a point indicated by reference numeral 414. The sharp drops in the PSNR which occur each time a keyframe is introduced are undesirable and are indicative of the video artifacts such as pulses or strobing which appear in a video presented on a display of a participant computing device which receives the video during a videoconference. Furthermore, the application-specified maximum QP value of 56 is applied when encoding the keyframe resulting in a lower quality keyframe.

Referring to FIG. 4B, a second graph 420 illustrates encoding results for processing video according to the second test video where keyframes are encoded according to the method for mitigating video artifacts as disclosed herein, where the constant a has a value of 0.85. As can be seen from second graph 420, the frame size of each of the video frames is generally consistent until the keyframe is encoded, which occurs at each of the bit rate spike points, for example as indicated by reference numeral 422. Compared to the example of FIG. 4A, the frame size of the keyframe in FIG. 4B is much larger than the keyframe of FIG. 4A (e.g., 17.69 kB compared to 10.91 kB). Corresponding to the encoding of the keyframe at the point indicated by reference numeral 422, a slight increase in the PSNR also occurs (for example, by about 1 dB) at a point indicated by reference numeral 424, which is less of a fluctuation compared to the fluctuation in PSNR as described with respect to FIG. 4A. In contrast to the example of FIG. 4A where the application-specified maximum QP value of 56 is applied when encoding the keyframe resulting in a lower quality keyframe, when the method for mitigating video artifacts as disclosed herein is applied the keyframe is encoded with a lower QP value (e.g., of about 47 as indicated by reference numeral 426). Video frames subsequent to the keyframe are also encoded by the video frame artifact mitigation module 121 by applying the method for mitigating video artifacts as disclosed herein, by steadily increasing the QP value according to a predetermined rate until reaching the application-specified maximum QP value, as indicated by reference numeral 428. For example, the QP value increases by about 2 for every frame after the keyframe until the application-specified maximum QP value is reached. As a tradeoff for processing the keyframe at a higher frame size, a latency may increase. For example, the average time for transmitting the keyframes according to the example of FIG. 4B may be about 295 ms (1000*8*average keyframe size/target bit rate or 1000*8*17.72 kilobytes/481,000 bits/sec) while the average time for transmitting the keyframes according to the example of FIG. 4A may be about 183 ms (1000*8*average keyframe size/target bit rate or 1000*8*11.01 kilobytes/481, 000 bits/sec).

As can be seen from the above-described examples, by applying the method for mitigating video artifacts as disclosed herein a standard deviation in PSNR can be reduced (i.e., less fluctuations are encountered in processing or encoding the keyframe as well as for video frames subsequent to the keyframe). For example, an average PSNR obtained for the second test video with respect to the example of FIG. 4A was 34.51 dB and a PSNR standard deviation was 1.21 dB, while an average PSNR obtained with respect to the example of FIG. 4B was 34.86 dB and a PSNR standard deviation was 0.97 dB. In addition, the bit rate obtained for the first test video from the example of FIG. 4A was 487,004 bits/second while the bit rate from the example of FIG. 4B was 491,288 bits/second. Therefore, similar bit rates were achieved while a steady and higher quality video is obtained (i.e., with the absence or reduction of video artifacts such as pulsing and strobing) by driving down the QP value which is applied to the keyframe when encoding the keyframe according to the method disclosed herein. For example, an average QP value for video frames encoded overall can be reduced, an average bit rate can be kept within an acceptable level of a target bit rate (e.g., within 5% of a target bit rate), a PSNR can be raised, a PSNR standard deviation can be reduced, and/or a ratio of an average keyframe size to an average P frame size can be kept within an acceptable level (e.g., a ratio of 15 or less, for example between 11 and 14).

Figure 5A:
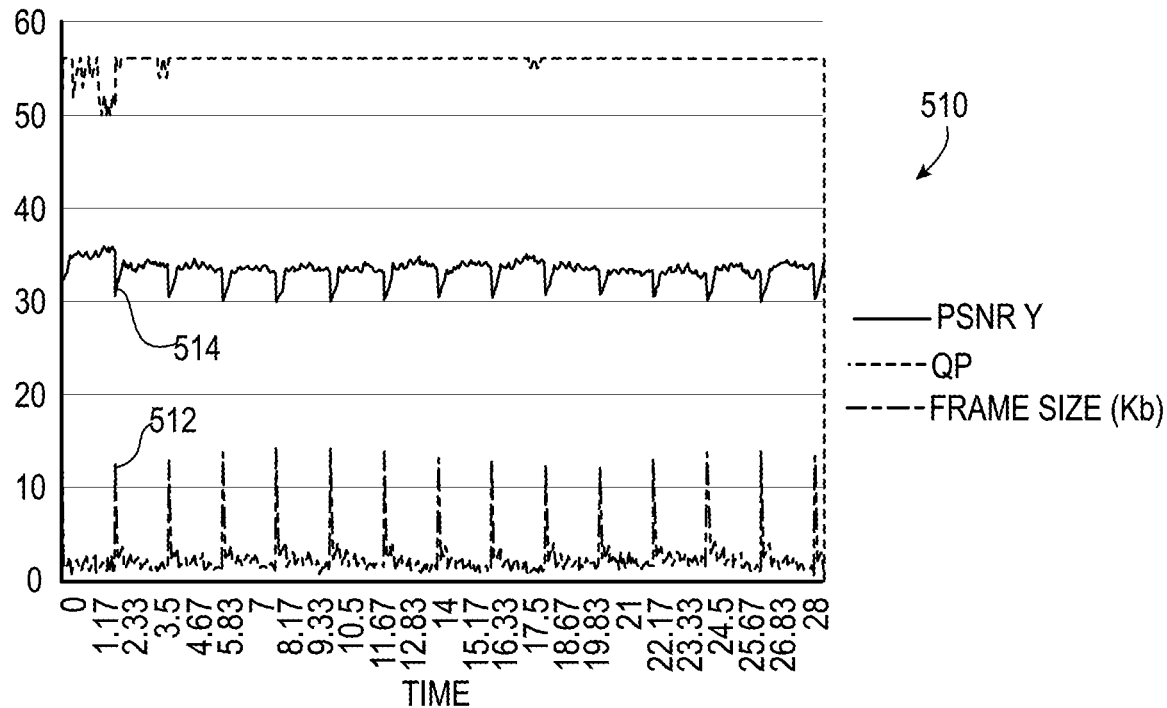
FIGS. 5A-5B depict example graphs illustrating encoding results for processing video according to a third test video, according to one or more example embodiments of the disclosure.
Figure 5B:
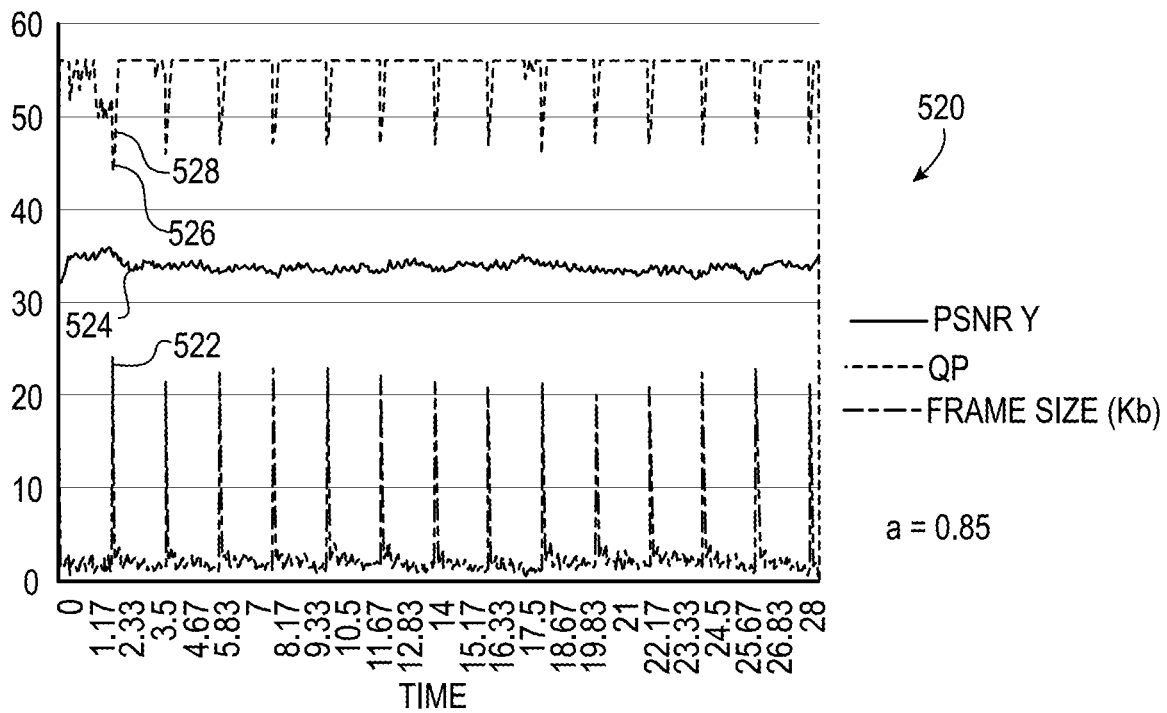

FIGS. 5A-5B depict example graphs illustrating encoding results for processing video according to a third test video, according to one or more example embodiments of the disclosure.

Referring to FIG. 5A, a first graph 510 illustrates encoding results for processing video according to the third test video where keyframes are encoded, however the method for mitigating video artifacts as disclosed herein is not applied. As can be seen from first graph 510, the frame size of each of the video frames is generally consistent until the keyframe is encoded, which occurs at each of the bit rate spike points, for example as indicated by reference numeral 512. Corresponding to the encoding of the keyframe at the point indicated by reference numeral 512, a sharp drop in the PSNR also occurs (for example, by about 5 dB) at a point indicated by reference numeral 514. The sharp drops in the PSNR which occur each time a keyframe is introduced are undesirable and are indicative of the video artifacts such as pulses or strobing which appear in a video presented on a display of a participant computing device which receives the video during a videoconference. Furthermore, the application-specified maximum QP value of 56 is applied when encoding the keyframe resulting in a lower quality keyframe.

Referring to FIG. 5B, a second graph 520 illustrates encoding results for processing video according to the third test video where keyframes are encoded according to the method for mitigating video artifacts as disclosed herein, where the constant a has a value of 0.85. As can be seen from second graph 520, the frame size of each of the video frames is generally consistent until the keyframe is encoded, which occurs at each of the bit rate spike points, for example as indicated by reference numeral 522. Compared to the example of FIG. 5A, the frame size of the keyframe in FIG. 5B is much larger than the keyframe of FIG. 5A (e.g., 24.06 kB compared to 12.68 kB). Corresponding to the encoding of the keyframe at the point indicated by reference numeral 522, a drop in the PSNR also occurs (for example, by less than 1 dB) at a point indicated by reference numeral 524, which is less of a decline compared to the decline in PSNR as described with respect to FIG. 5A. In contrast to the example of FIG. 5A where the application-specified maximum QP value of 56 is applied when encoding the keyframe resulting in a lower quality keyframe, when the method for mitigating video artifacts as disclosed herein is applied the keyframe is encoded with a lower QP value (e.g., of about 44 as indicated by reference numeral 526). Video frames subsequent to the keyframe are also encoded by the video frame artifact mitigation module 121 by applying the method for mitigating video artifacts as disclosed herein, by steadily increasing the QP value according to a predetermined rate until reaching the application-specified maximum QP value, as indicated by reference numeral 528. For example, the QP value increases by about 2 for every frame after the keyframe until the application-specified maximum QP value is reached. As a tradeoff for processing the keyframe at a higher frame size, a latency may increase. For example, the average time for transmitting the keyframes according to the example of FIG. 5B may be about 360 ms (1000*8*average keyframe size/target bit rate or 1000*8*21.65 kilobytes/481,000 bits/sec) while the average time for transmitting the keyframes according to the example of FIG. 5A may be about 226 ms (1000*8*average keyframe size/target bit rate or 1000*8*13.57 kilobytes/481, 000 bits/sec).

As can be seen from the above-described examples, by applying the method for mitigating video artifacts as disclosed herein a standard deviation in PSNR can be reduced (i.e., less fluctuations are encountered in processing or encoding the keyframe as well as for video frames subsequent to the keyframe). For example, an average PSNR obtained for the third test video with respect to the example of FIG. 5A was 33.40 dB and a PSNR standard deviation was 1.00, while an average PSNR obtained with respect to the example of FIG. 5B was 33.83 dB and a PSNR standard deviation was 0.55. In addition, the bit rate obtained for the first test video from the example of FIG. 5A was 536,138 bits/second while the bit rate from the example of FIG. 5B was 547,582 bits/second. Therefore, similar bit rates were achieved while a steady and higher quality video is obtained (i.e., with the absence or reduction of video artifacts such as pulsing and strobing) by driving down the QP value which is applied to the keyframe when encoding the keyframe according to the method disclosed herein. For example, an average QP value for video frames encoded overall can be reduced, an average bit rate can be kept within an acceptable level of a target bit rate (e.g., within 5% of a target bit rate), a PSNR can be raised, a PSNR standard deviation can be reduced, and/or a ratio of an average keyframe size to an average P frame size can be kept within an acceptable level (e.g., a ratio of 15 or less, for example between 11 and 14).

Terms such as "module", and "unit," may be used herein in association with various features of the disclosure (e.g., the video frame artifact mitigation module 121). Such terms may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Aspects of the above-described example embodiments may be recorded in computer-readable media (e.g., non-transitory computer-readable media) including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks, Blue-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

The technology discussed herein may make reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the disclosed subject matter has been described in detail with respect to various example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the disclosed subject matter as would be readily apparent to one of ordinary skill in the art. For instance, features illustrated or described as part of one embodiment can be used with another embodiment to yield a still further embodiment. Thus, it is intended that the disclosure cover such alterations, variations, and equivalents.

What is claimed is:

1. A computer-implemented method, comprising:
    setting, by a participant computing device participating in a videoconference, a maximum quantization parameter (QP)
    value for encoding a predetermined type of video frame to a value which is a lesser value between a first QP value and a second QP value, wherein:
        the first QP value is determined based on an average value of QP values used to encode video frames before the predetermined type of video frame, and
        the second QP value corresponds to an application-specified maximum QP value;
    setting a third QP value that is less than or equal to the set maximum QP value for encoding the predetermined type of video frame; and
    encoding the predetermined type of video frame using the set third QP value.

2. The computer-implemented method of claim 1, wherein the predetermined type of video frame is a keyframe.

3. The computer-implemented method of claim 2, wherein the keyframe is encoded based on another participating computing device joining the videoconference.

4. The computer-implemented method of claim 2, wherein the keyframe is encoded based on a request to change a video resolution by another participant computing device participating in the videoconference.

5. The computer-implemented method of claim 2, wherein the keyframe is encoded based on a request sent to the participating computing device for the keyframe from another participant computing device participating in the videoconference which is recovering from a network error.

6. The computer-implemented method of claim 1, wherein, when the set maximum QP value corresponds to the first QP value, the method further comprises encoding one or more video frames after the predetermined type of video frame using respective QP values that are less than or equal to the set maximum QP value.

7. The computer-implemented method of claim 1, wherein when the set maximum QP value corresponds to the first QP value, the method further comprises:
increasing the set maximum QP value by a predetermined rate for each of one or more video frames to be encoded after the predetermined type of video frame until the application-specified maximum QP value is reached.

8. The computer-implemented method of claim 2, further comprising determining the first QP value based on the average value of QP values used to encode video frames within a predetermined period of time before a time the keyframe is to be encoded by the participant computing device.

9. The computer-implemented method of claim 8, further comprising determining the first QP value based on a product of the average value of QP values used to encode video frames within the predetermined period of time before the time the keyframe is to be encoded by the participant computing device and a constant value which is less than one and greater than zero.

10. The computer-implemented method of claim 9, wherein the constant value varies based on a content and noise level of the keyframe.

11. The computer-implemented method of claim 2, further comprising determining the first QP value based on the average value of QP values used to encode a predetermined number of video frames before the keyframe.

12. The computer-implemented method of claim 11, further comprising determining the first QP value based on a product of the average value of QP values used to encode the predetermined number of video frames before the keyframe and a constant value which is less than one and greater than zero.

13. The computer-implemented method of claim 12, wherein the constant value varies based on a content and noise level of the keyframe.

14. A computing system, comprising:
one or more processors; and
one or more non-transitory computer-readable media that store instructions that, when executed by the one or more processors, cause the computing system to perform operations, the operations comprising:
setting, by the computing system participating in a videoconference, a maximum quantization parameter (QP) value for encoding a predetermined type of video frame to a value which is a lesser value between a first QP value and a second QP value, wherein:
the first QP value is determined based on an average value of QP values used to encode video frames before the predetermined type of video frame, and
the second QP value corresponds to an application-specified maximum QP value,
setting a third QP value that is less than or equal to the set maximum QP value for encoding the predetermined type of video frame, and
encoding the predetermined type of video frame using the set third QP value.

15. The computing system of claim 14, wherein the predetermined type of video frame is a keyframe.

16. The computing system of claim 15, wherein the keyframe is encoded based on at least one of:
another computing system joining the videoconference,
a request to change a video resolution by another computing system participating in the videoconference, or
a request sent to the computing system for the keyframe from another computing system participating in the videoconference which is recovering from a network error.

17. The computing system of claim 14, wherein when the set maximum QP value corresponds to the first QP value, the operations further comprise:
increasing the set maximum QP value by a predetermined rate for each of one or more video frames after the predetermined type of video frame until the application-specified maximum QP value is reached.

18. The computing system of claim 17, wherein the predetermined rate is based on a codec used to encode the one or more video frames after the predetermined type of video frame.

19. The computing system of claim 15, wherein the operations further comprise:
determining the first QP value based on the average value of QP values used to encode video frames within a predetermined period of time before a time the keyframe is to be encoded by the computing system, or
determining the first QP value based on the average value of QP values used to encode a predetermined number of video frames before the keyframe.

20. A computer-implemented method, comprising:
setting, by a participant computing device participating in a videoconference, a maximum quantization parameter (QP) value for encoding a keyframe to a value which is a lesser value between a first QP value and a second QP value, wherein:
the first QP value is determined based on an average value of QP values used to encode video frames before the keyframe, and
the second QP value corresponds to an application-specified maximum QP value;
setting a third QP value that is less than or equal to the set maximum QP value for encoding the keyframe; and
encoding the keyframe using the third QP value; and
when the set maximum QP value corresponds to the first QP value, increasing the set maximum QP value by a predetermined rate for each of one or more video frames to be encoded after the keyframe until the application-specified maximum QP value is reached.

* * * * *